(12) United States Patent
Tang et al.

(10) Patent No.: US 11,747,691 B2
(45) Date of Patent: Sep. 5, 2023

(54) DISPLAY PANEL AND DISPLAY DEVICE

(71) Applicant: WUHAN CHINA STAR OPTOELECTRONICS TECHNOLOGY CO., LTD., Wuhan (CN)

(72) Inventors: Fuhsiung Tang, Wuhan (CN); Yanqing Guan, Wuhan (CN); Congxing Yang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 276 days.

(21) Appl. No.: 17/281,935

(22) PCT Filed: Jan. 29, 2021

(86) PCT No.: PCT/CN2021/074293
§ 371 (c)(1),
(2) Date: Mar. 31, 2021

(87) PCT Pub. No.: WO2022/141725
PCT Pub. Date: Jul. 7, 2022

(65) Prior Publication Data
US 2023/0107909 A1 Apr. 6, 2023

(30) Foreign Application Priority Data
Dec. 30, 2020 (CN) .......................... 202011604463.0

(51) Int. Cl.
G02F 1/1368 (2006.01)
G02F 1/1362 (2006.01)
G09G 3/36 (2006.01)

(52) U.S. Cl.
CPC ...... *G02F 1/1368* (2013.01); *G02F 1/136286* (2013.01); *G09G 3/3677* (2013.01)

(58) Field of Classification Search
CPC ...................................................... G02F 1/1368
See application file for complete search history.

(56) References Cited

U.S. PATENT DOCUMENTS

2004/0195570 A1 10/2004 Koo et al.
2016/0204166 A1 7/2016 Yang et al.
(Continued)

FOREIGN PATENT DOCUMENTS

CN 101350367 A 1/2009
CN 102023445 A 4/2011
(Continued)

*Primary Examiner* — Sang V Nguyen
(74) *Attorney, Agent, or Firm* — PV IP PC; Wei Te Chung; Zhigang Ma

(57) ABSTRACT

A display panel and a display device are disclosed. The display panel includes a transistor disposed in the non-display area. The transistor includes a charge inducing layer, and a first insulating layer, an active layer, a second insulating layer, and a gate electrode all disposed on the charge inducing layer, so that the actively layer, the gate electrode, and the charge inducing layer collectively form a capacitance system, which benefits extending of the conduction time of the transistor, thereby giving a boost to an increase in a charging rate of the data line, and ensuring a smooth display of the display panel.

17 Claims, 6 Drawing Sheets

(56) References Cited

U.S. PATENT DOCUMENTS

| | | | |
|---|---|---|---|
| 2017/0162144 A1* | 6/2017 | Chen | G02F 1/1368 |
| 2017/0186782 A1 | 6/2017 | Lee et al. | |
| 2019/0206905 A1* | 7/2019 | Gu | H01L 29/41733 |
| 2020/0089069 A1* | 3/2020 | Morinaga | G02F 1/1368 |
| 2020/0203532 A1* | 6/2020 | Yamazaki | H01L 29/7869 |
| 2020/0243021 A1* | 7/2020 | Li | G09G 3/3266 |
| 2021/0408293 A1* | 12/2021 | Chiang | H01L 29/24 |

FOREIGN PATENT DOCUMENTS

| | | | |
|---|---|---|---|
| CN | 103474573 A | 12/2013 |
| CN | 104020618 A | 9/2014 |
| CN | 104932165 A | 9/2015 |
| CN | 107219698 A | 9/2017 |
| CN | 108281488 A | 7/2018 |
| CN | 109037468 A | 12/2018 |
| CN | 110581142 A | 12/2019 |
| CN | 111681624 A | 9/2020 |
| CN | 111755464 A | 10/2020 |

* cited by examiner

DISPLAY PANEL AND DISPLAY DEVICE

RELATED APPLICATIONS

This application is a Notional Phase of PCT Patent Application No. PCT/CN2021/074293 having international filing date of Jan. 29, 2021, which claims the benefit of priority of Chinese Patent Application No. 202011604463.0 filed on Dec. 30, 2020. The contents of the above applications are all incorporated by reference as if fully set forth herein in their entirety.

BACKGROUND OF INVENTION

1. Field of Invention

The present invention relates to a technical field of displays, and particularly to, a display panel and a display device.

2. Related Art

Display devices are provided with source and drain signal control areas to control a source electrode and a drain electrode of each transistor in display areas, which enables switching control of display screens of the display devices. However, conduction time of each transistor in the source and drain signal control areas will affect charging rates of data lines, thereby adversely influencing the smoothness of the display. Under requirements for display panels having high refresh rates, high resolutions, etc., switching frequencies of each transistor in the source and drain signal control areas become faster, and the conduction time of each transistor becomes shorter, resulting in shorter charging time of the data lines, and adversely affecting the smoothness of display screens.

SUMMARY OF INVENTION

An object of an embodiment of the present application is to provide a display panel and a display device to improve a problem that conventional display panels do not display smoothly due to insufficient charging rates of data lines under requirements of high resolutions and high refresh rates.

An embodiment of the present application provides a display panel, comprising a display area and a non-display area, and the display panel comprising a transistor disposed in the non-display area; wherein the transistor comprises an active layer; a charge inducing layer disposed on a side of the active layer; a first insulating layer disposed between the active layer and the charge inducing layer; a gate electrode disposed on a side of the active layer away from the charge inducing layer; and a second insulating layer disposed between the active layer and the gate electrode.

In one embodiment, based on a turn-on signal applied to the gate electrode and/or the charge inducing layer, a first charge is induced on an upper surface of the active layer, and a second charge is induced on a lower surface of the active layer and is different from a charge in polarity on an upper surface of the charge inducing layer, wherein an upper conductive channel and a lower conductive channel are disposed on the upper surface and the lower surface of the active layer, respectively, subject to accumulation of the first charge and the second charge; wherein, based on a turn-off signal applied to the gate electrode and/or the charge inducing layer, a charge different from the first charge in polarity is induced on the upper surface of the active layer, a charge different form the second charge in polarity is induced on the lower surface of the active layer, wherein the upper conductive channel and the lower conductive channel are sequentially closed subject to a decrease of the first charge and the second charge.

In one embodiment, the turn-on signal comprises a first turn-on signal applied to the gate electrode and a second turn-on signal applied to the charge inducing layer, wherein the first turn-on signal and the second turn-on signal are voltage signals with a same magnitude.

In one embodiment, the non-display area comprises a data signal control area, the display panel comprises a demultiplexer located in the data signal control area, and the transistor comprises a first transistor located in the data signal control area, wherein the demultiplexer includes the first transistor.

In one embodiment, the display panel further comprises a data line arranged in the display area, and a first control line arranged in the data signal control area, wherein one of a source electrode or a drain electrode provided by the first transistor is electrically connected to the first control line, and another one of the source electrode or the drain electrode is electrically connected to the data line.

In one embodiment, the first control line includes a data bus line.

In one embodiment, the non-display area comprises a scan signal control area, the display panel comprises a gate driver circuit disposed in the scan signal control area, and the transistor comprises a second transistor located in the scan signal control area, wherein the gate driver circuit comprises the second transistor.

In one embodiment, the display panel further comprises a scan line arranged in the display area and intersecting the data line, and a second control line arranged in the scan signal control area, wherein one of a source electrode or a drain electrode provided by the second transistor is electrically connected to the second control line, and another one of the source electrode or the drain electrode is electrically connected to the scan line.

In one embodiment, the second control line comprises a clock signal line and a power supply voltage line.

In one embodiment, the display panel further comprises a signal generation module disposed in the scan signal control area, wherein the signal generation module is configured to generate a second control signal according to an input control signal, and the second control signal is configured to control turning on and off of the second transistor.

In one embodiment, the transistor further comprises a third transistor disposed in the scan signal control area, and the signal generation module comprises the third transistor.

In one embodiment, the display panel further comprises a driving transistor disposed in the display area and a subpixel electrically connected to the driving transistor, wherein the driving transistor is configured to be turned on in response to a scan signal provided by the scan line, and drive the subpixel to emit light according to a data signal provided by the data line.

In one embodiment, an orthographic projection defined by the active layer is projected within a boundary of the charge inducing layer.

In one embodiment, the charge inducing layer has a thickness greater than or equal to 300 angstroms and less than or equal to 700 angstroms.

The present application further provides a display device comprising any one of the above-mentioned display panels.

The present application has advantageous effects as follows: compared to the prior art, an embodiment of the present application provides a display panel and a display device. The display panel includes a display area and a non-display area. The display panel includes a transistor disposed in the non-display area, and the transistor includes an active layer, a charge inducing layer, a gate electrode, a first insulating layer, and a second insulating layer. The charge inducing layer is disposed on a side of the active layer. The first insulating layer is disposed between the active layer and the charge inducing layer. The gate electrode is disposed on a side of the active layer away from the charge inducing layer. The second insulating layer is disposed between the active layer and the gate electrode. In this manner, the actively layer, the gate electrode, and the charge inducing layer collectively form a capacitance system, which benefits extending of the conduction time of the transistor, thereby giving a boost to an increase in a charging rate of the data line, and ensuring a smooth display of the display panel.

Figure 1A:
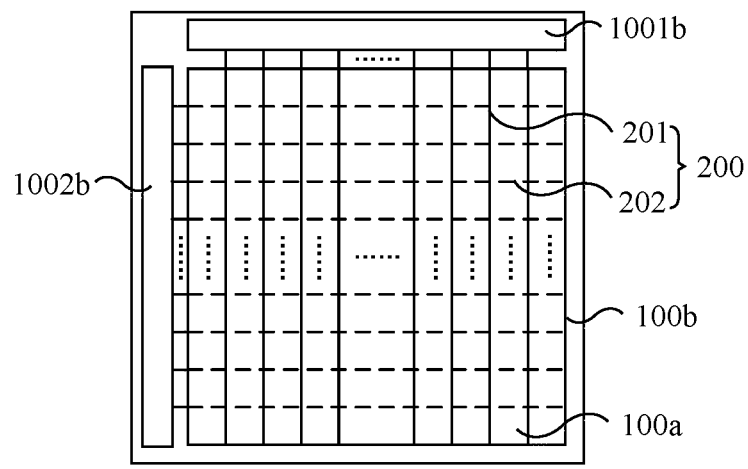
FIGS. 1A to 1D are schematic structural views of a display panel provided by an embodiment of the application.

DESCRIPTION OF PREFERRED
EMBODIMENTS

In order to make the purpose, technical solutions, and effects of this application clearer, the following further describes this application in detail with reference to the drawings and embodiments. It should be understood that the specific embodiments described here are only used to explain the application, and not used to limit the application.

Specifically, please refer to FIGS. 1A to 1D which are schematic structural views of a display panel provided by an embodiment of the present application. FIGS. 2A to 2E are schematic structural views of a transistor provided by an embodiment of the present application.

An embodiment of the present application provides a display panel. Preferably, the display panel may be a liquid crystal display panel, a self-luminous display panel, a quantum dot display panel, etc. Further, the self-luminous display panel includes at least one light-emitting device of organic light-emitting diodes, sub-millimeter light-emitting diodes, or miniature light-emitting diodes.

The display panel includes a display area 100a, a non-display area 100b, and a transistor T disposed in the non-display area 100b. Optionally, the transistor T includes a field-effect transistor; further, the transistor T includes a thin-film transistor. In addition, the transistor T includes an N-type transistor and a P-type transistor.

Please continue referring to FIGS. 2A to 2E. The transistor T includes an active layer 101, a charge inducing layer 102, a first insulating layer 1041, a second insulating layer 1042, a gate electrode 103, a source electrode, and a drain electrode. Optionally, the active layer 101 includes at least one of a silicon active layer, an oxide active layer, and the like. The active layer 101 includes a channel region 101c and doped regions 101d located on both sides of the channel region 101c. The source electrode and the drain electrode may be directly formed by the doped region 101d, or may be formed by electrodes electrically connected to the doped region 101d and the doped region 101d, and details thereof will not be repeated here.

Figure 2A:
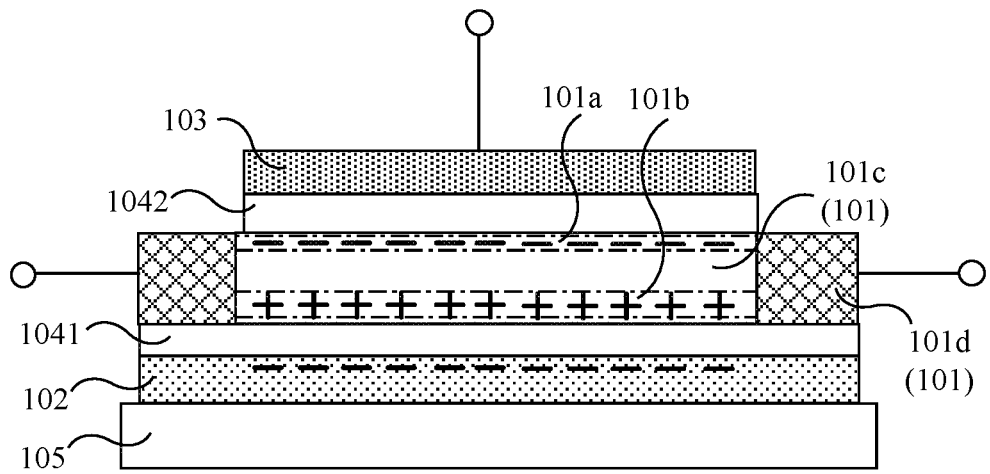
FIGS. 2A to 2E are schematic structural views of a transistor provided by an embodiment of the application.
Figure 2B:
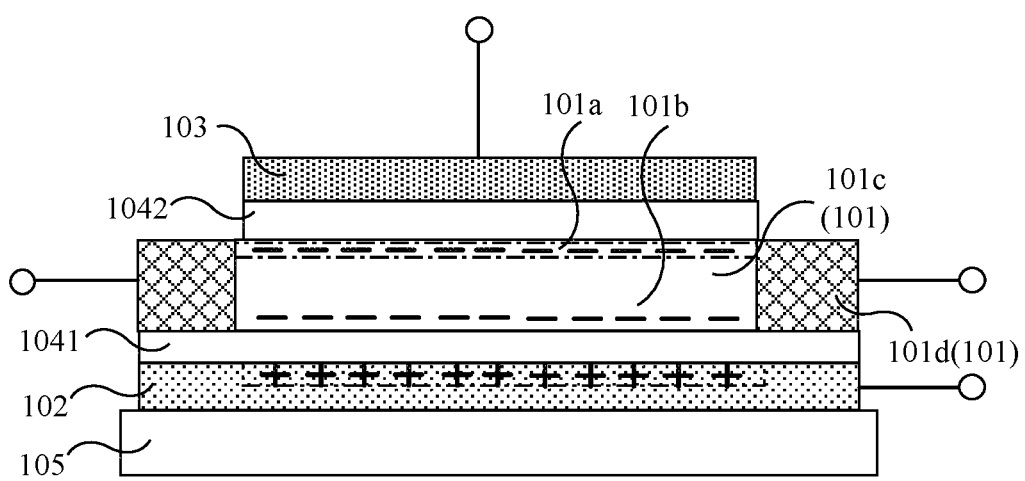
Figure 2C:
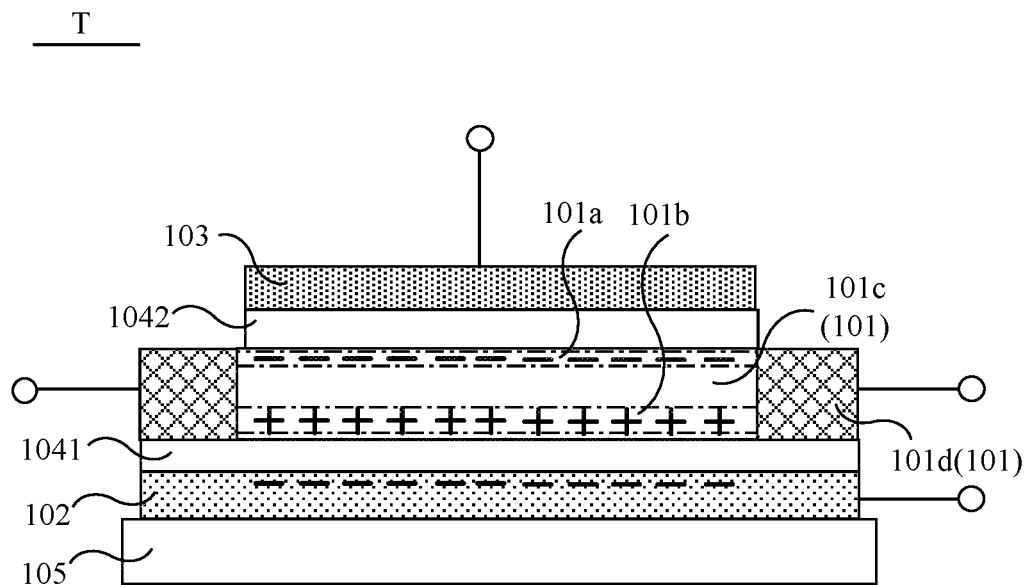

Please continue referring to FIGS. 2A to 2C. The charge inducing layer 102 is disposed on a side of the active layer 101. The gate electrode 103 is disposed on a side of the active layer 101 away from the charge inducing layer 102. The first insulating layer 1041 is disposed between the active layer 101 and the charge inducing layer 102, and the second insulating layer 1042 is disposed between the active layer 101 and the gate electrode 103, so that the charge inducing layer 102 and the gate electrode 103 together form a capacitance system.

Figure 2D:
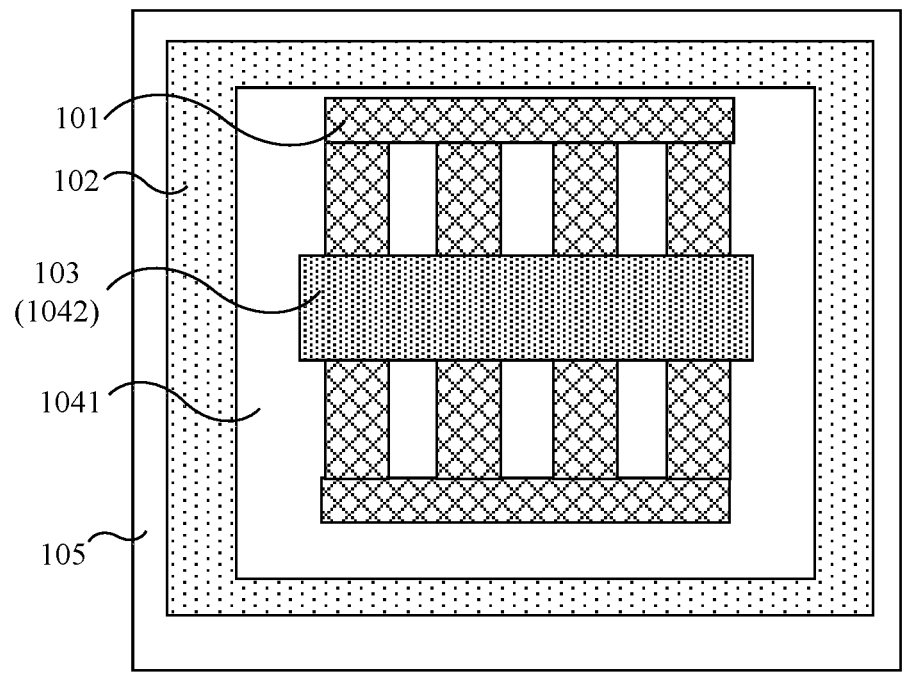
Figure 2E:
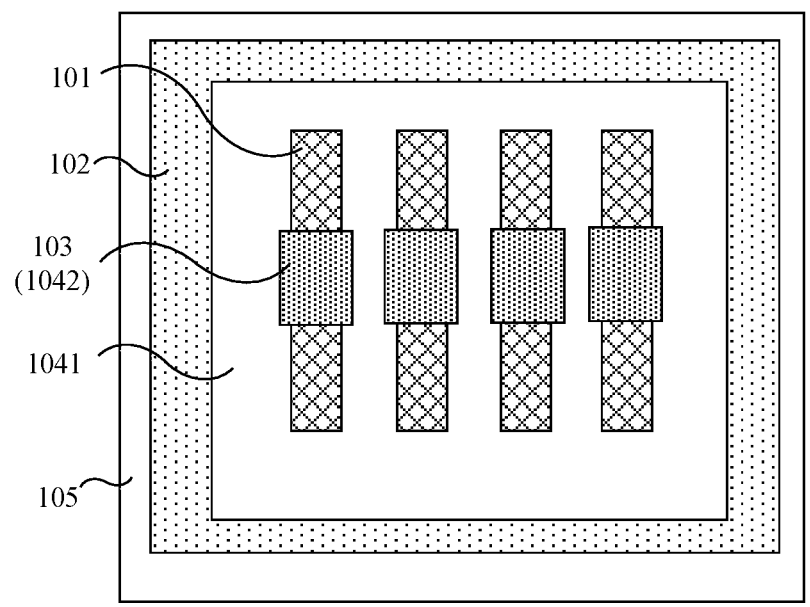

Please continue referring to FIGS. 2D to 2E, an orthographic projection defined by the active layer 101 is projected within a boundary of the charge inducing layer 102, thereby to reduce influence of light on the active layer 101, avoid a decrease of a switching ratio of the transistor T, and ensure that the transistor T has better electrical performance. The influence of light on the active layer 101 includes the influence of light emitted by a backlight source of the display panel and the influence of external light on the active layer 101. Optionally, a material of the charge inducing layer 102 includes at least one of molybdenum, silver, aluminum, gold, and the like.

In addition, in order to prevent a residual stress on the charge inducing layer 102 from adversely affecting the display panel during a process of manufacturing the display panel (such as causing cracks, disconnection, etc.), to provide shielding for the active layer 101, and to avoid a problem of a relatively large leakage current arising from the transistor being affected by the light, the charge inducing layer 102 has a thickness greater than or equal to 300 angstroms and less than or equal to 700 angstroms.

The transistor T is turned on and off through a switch signal. Further, the switch signal includes a turn-on signal that controls the transistor T to turn on, and a turn-off signal that controls the transistor T to turn off. Optionally, the switch signal is a voltage signal.

Based on a turn-on signal applied to the gate electrode 103 and/or the charge inducing layer 102, a first charge is induced on an upper surface of the active layer 101, and a second charge is induced on a lower surface of the active layer 101 and is different from a charge in polarity on an upper surface of the charge inducing layer 102. In this manner, an upper conductive channel 101a and a lower conductive channel 101b are formed on the upper surface and the lower surface of the active layer 101, respectively, subject to accumulation of the first charge and the second charge.

Based on a turn-off signal applied to the gate electrode 103 and/or the charge inducing layer 102, a charge different from the first charge in polarity is induced on the upper surface of the active layer 101, a charge different form the second charge in polarity is induced on the lower surface of the active layer 101. In this manner, the upper conductive channel 101a and the lower conductive channel 101b are sequentially closed subject to a decrease of the first charge and the second charge, thereby to realize functions of accelerating the turn-on of the transistor T or slow down the turn-off of the transistor T, as well as extending a turn-on time of the transistor T.

Further, please refer to FIG. 2A. the switch signal includes a first switch signal applied to the gate electrode 103 and a second switch signal applied to the charge inducing layer 102. The transistor T can be turned on and turned off by the first switch signal and/or the second switch signal.

Specifically, if the transistor T is turned on and off by the first switch signal, the first switch signal includes a first turn-on signal that enables the transistor T to turn on, and a first turn-off signal that enables the transistor T to turn off.

When the gate electrode 103 responds to the first turn-on signal, the capacitance system formed by the active layer 101, the charge inducing layer 102 and the gate electrode 103 makes each of the upper surface of the active layer 101 and the upper surface of the charge inducing layer 102 induce same charges in polarity (that is, the upper surface of the active layer 101 and the upper surface of the charge inducing layer 102 both induce the first charge). With accumulation of inducing charges, an upper conductive channel 101a is formed on the upper surface of the active layer 101 in the transistor T. A charge induced on the upper surface of the charge inducing layer 102 further makes the lower surface of the active layer 101 induce a charge different from the charge induced on the upper surface of the charge inducing layer 102 (that is, the second charge is induced on the lower surface of the active layer 101). With accumulation of the second charge, a lower conductive channel 101b is formed on the lower surface of the active layer 101 in the transistor T. A concurrent conduction of the upper conductive channel 101a and the lower conductive channel 101b may enable the transistor T to turn on in advance.

When the gate electrode 103 responds to the first turn-off signal, the upper surface of the active layer 101 induces a charge different from the first charge in polarity, and the lower surface of the active layer 101 induces a charge different from the second charge in polarity. In this manner, the upper conductive channel 101a and the lower conductive channel 101b are sequentially closed subject to a decrease of the first charge and the second charge, thereby to delay a turn-off time of the transistor T so that a turn-on time of the transistor T can be extended.

Specifically, the actively layer 101, the charge inducing layer 102, and the gate electrode 103 collectively form a capacitance system in such a way that the active layer 101, the charge inducing layer 102, and the first insulating layer 1041 located between the active layer 101 and the charge inducing layer 102 form a first capacitor. The active layer 101 and the charge inducing layer 102 form two plates of the first capacitor, respectively, and the first insulating layer 1041 functions as a dielectric layer of the first capacitor. The active layer 101, the gate electrode 103, and the second insulating layer 1042 located between the active layer 101 and the gate electrode 103 form a second capacitor. The active layer 101 and the gate electrode 103 form two plates of the second capacitor, respectively, and the second insulating layer 1042 functions as a dielectric layer of the second capacitor. Since an impedance value of the active layer 101 is much higher than impedance values of the gate electrode 103 and the charge inducing layer 102, the charge inducing layer 102 is mainly affected by changes in the gate electrode 103, so that the charge inducing layer 102 and the gate electrode 103 form two plates of a third capacitor.

Since the upper surface of the active layer 101 and the upper surface of the charge inducing layer 102 are affected by the first turn-on signal applied by the gate electrode 103, opposite charges are directly induced thereon (i.e. the first charge is induced), and the lower surface of the active layer 101 is affected by the charge inducing layer 102 to induce a charge different in polarity from the charge on the upper surface of the charge inducing layer 102 (i.e. the second charge is induced). Therefore, the lower surface of the active layer 101 induces a charge under an indirect influence of the first turn-on signal applied by the gate electrode 103. As a result, there is a slight time difference between the turn-on time and the turn-off time of the upper conductive channel 101a and the lower conductive channel 101b. Therefore, after the upper conductive channel 101a is turned on, the lower conductive channel 101b is then turned on, and the currents flowing through the upper conductive channel 101a and the lower conductive channel 101b are superimposed, causing an increase in the current flowing through the active layer 101, thereby enabling an early turn-on of the transistor T. After the upper conductive channel 101a is turned off, the lower conductive channel 101b is then turned off, and the currents flowing through the upper conductive channel 101a and the lower conductive channel 101b are sequentially reduced, causing a gradual decrease in the current flowing through the active layer 101, thereby enabling a function of slowing the turn-off of the transistor T.

Specifically, please continue to refer to FIG. 2A, taking the transistor T as an N-type transistor as an example to describe turn-on and turn-off processes of the transistor T.

When the first turn-on signal is applied to the gate electrode 103 (that is, a voltage applied by the gate electrode 103 jumps from a low level to a high level, and the gate electrode 103 is forward biased), the upper surface of the active layer 101 and the upper surface of the charge inducing layer 102 begin to accumulate negative charges (that is, the first charge is negative at this time), and the negative charges accumulated on the upper surface of the charge inducing layer 102 further enables the lower surface of the active layer 101 begins to accumulate positive charges (that is, the second charge is positive at this time). As a voltage value of the first turn-on signal continues to increase, the first charge and the second charge continue to accumulate. When the voltage value of the first turn-on signal is greater than a threshold voltage, the transistor T forms the upper conductive channel 101a and the lower conductive channel 101b on the upper and lower surfaces of the active layer 101, respectively. Carrier types of the upper conductive channel 101a and the lower conductive channel 101b are different, but flow directions of the carriers are the same, so that the currents flowing through the upper conductive channel 101a and the lower conductive channel 101b are superimposed, which can accelerate the turn-on of the transistor T. Specifically, the carriers of the upper conductive channel 101a are electrons, and the carriers of the lower conductive channel 101b are holes.

When the first turn-off signal is applied to the gate electrode 103 (that is, a voltage applied by the gate electrode 103 jumps from a high level to a low level, and the gate electrode 103 is reverse biased), the upper surface of the active layer 101 and the upper surface of the charge inducing layer 102 begin to accumulate positive charges (that is, negative charges are decreased corresponding to the first charge), and the positive charges accumulated on the upper surface of the charge inducing layer 102 further cause the lower surface of the active layer 101 to begin to accumulate negative charges (that is, positive charges are decreased corresponding to the second charge). As a voltage value of the first turn-off signal continues to decrease, the first charge and the second charge continue to reduce. When the voltage value of the first turn-off signal is less than the threshold voltage, a number of holes in the upper conductive channel 101a is greater than a number of electrons, and a number of electrons in the lower conductive channel 101b is greater than a number of holes. The upper conductive channel 101a and the lower conductive channel 101b are sequentially closed, thereby delaying the turn-off of the transistor T.

It can be understood that a working principle when the transistor T is a P-type transistor is similar to a working principle when the transistor T is an N-type transistor, and details will not be repeated here.

Similarly, the second switch signal includes a second turn-on signal that enables the transistor T to turn on, and a second turn-off signal that enables the transistor T to turn off; the working principle of the transistor T being turned on and off by the second switch signal is similar to the working principle of the transistor T being turned on and off by the first switch signal, and details will not be repeated here.

Please continue to refer to FIGS. 2B to 2C. If the transistor T is turned on and off by the first switch signal and the second switch signal, the charges induced on the upper and lower surfaces of the active layer 101 are different according to different types of the first switch signal and the second switch signal.

Specifically, please continue referring to FIG. 2B. Under a condition that magnitudes, phases, and frequencies of the first switch signal and the second switch signal are the same, the gate electrode 103 and the charge inducing layer 102 are equivalent to the same potential. When the first turn-on signal and the second turn-on signal are applied to the gate electrode 103 and the charge inducing layer 102, respectively, the upper surface of the active layer 101 induces the first charge different in polarity from a charge on the lower surface of the gate electrode 103, and the lower surface of the active layer 101 induces the second charge different in polarity from the lower surface of the charge inducing layer 102. As the first charge and the second charge are accumulated, the upper surface and the lower surface of the active layer 101 form an upper conductive channel 101a and a lower conductive channel 101b, respectively. When the first turn-off signal and the second turn-off signal are applied to the gate electrode 103 and the charge inducing layer 102, respectively, the upper surface of the active layer 101 induces a charge different from the first charge in polarity, the lower surface of the active layer 101 induces a charge different from the second charge in polarity. In this manner, the upper conductive channel 101a and the lower conductive channel 101b are sequentially closed subject to a decrease of the first charge and the second charge, thereby enabling functions of accelerating the turn-on or slowing the turn-off of the transistor T, so that a turn-on time of the transistor T can be extended.

Specifically, the first charge and the second charge are of the same type, that is, the first charge and the second charge are both positive or negative. Correspondingly, the carriers of the upper conductive channel 101a and the lower conductive channel 101b are holes, or the carriers of the upper conductive channel 101a and the lower conductive channel 101b are electrons.

Specifically, taking the transistor T as an N-type transistor as an example to describe turn-on and turn-off processes of the transistor T.

When the first turn-on signal is applied to the gate electrode 103 and the second turn-on signal is applied to the charge inducing layer 102 (that is, a voltage applied by the gate electrode 103 and a voltage applied by the charge inducing layer 102 both jump from low to high, the gate electrode 103 is applied with a forward bias, and the charge inducing layer 102 is applied with a positive voltage signal), the upper and lower surfaces of the active layer 101 begin to accumulate negative charge (that is, the first charge and the second charge are both negative charges at this time). As voltage values of the first turn-on signal and the second turn-on signal continue to increase, the first charge and the second charge continue to accumulate. When the voltage value of the first turn-on signal is greater than a threshold voltage, the transistor T forms the upper conductive channel 101a and the lower conductive channel 101b on the upper and lower surfaces of the active layer 101, respectively. Carrier types of the upper conductive channel 101a and the lower conductive channel 101b are the same, and flow directions of the carriers are the same, so that the currents flowing through the upper conductive channel 101a and the lower conductive channel 101b are superimposed, which can accelerate the turn-on of the transistor T. Specifically, the carriers of the upper conductive channel 101a and the lower conductive channel 101b are electrons.

When the first turn-off signal is applied to the gate electrode 103, and the second turn-off signal is applied to the charge inducing layer 102 (that is, a voltage applied by the gate electrode 103 and a voltage applied by the charge inducing layer 102 jump from a high level to a low level, the gate electrode 103 is reverse biased, and the charge inducing layer 102 is applied with a negative voltage signal), the upper surface and the lower surface of the active layer 101 begin to accumulate positive charges (that is, negative charges are decreased corresponding to the first charge and the second charge). As voltage values of the first turn-off signal and the second turn-off signal continue to decrease, the first charge and the second charge continue to reduce. When the voltage value of the first turn-off signal is less than the threshold voltage, a number of holes in the upper conductive channel 101a and the lower conductive channel 101b is greater than a number of electrons, and the upper conductive channel 101a and the lower conductive channel 101b are sequentially closed, thereby delaying the turn-off of the transistor T.

It can be understood that a working principle when the transistor T is a P-type transistor is similar to a working principle when the transistor T is an N-type transistor, and details will not be repeated here.

Specifically, please continue referring to FIG. 2C. Under a condition that magnitudes, phases, and frequencies of the first switch signal and the second switch signal are the same, if the first switch signal and the second switch signal are inverted, the gate electrode 103 and the charge inducing layer 102 are applied with the first turn-on signal and the second turn-on signal, respectively, the upper surface of the active layer 101 induces the first charge that is different from a charge on the lower surface of the gate electrode 103, and the lower surface of the active layer 101 induces the second charge that is different from a charge on the lower surface of the charge inducing layer 102. As the first charge and the second charge are accumulated, the upper surface and the lower surface of the active layer 101 form an upper conductive channel 101a and a lower conductive channel 101b, respectively. When the first turn-off signal and the second turn-off signal are applied to the gate electrode 103 and the charge inducing layer 102, respectively, the upper surface of the active layer 101 induces a charge different from the first charge in polarity, the lower surface of the active layer 101 induces a charge different from the second charge in polarity. In this manner, the upper conductive channel 101a and the lower conductive channel 101b are sequentially closed subject to a decrease of the first charge and the second charge, thereby enabling functions of accelerating the turn-on or slowing the turn-off of the transistor T, so that a turn-on time of the transistor T can be extended.

Specifically, types of the first charge and the second charge are different, that is, the first charge is one of a positive charge or a negative charge, and the second charge is the other one of the positive charge or the negative charge.

Specifically, taking the transistor T as an N-type transistor as an example to describe turn-on and turn-off processes of the transistor T.

When the first turn-on signal is applied to the gate electrode 103 and the second turn-on signal is applied to the charge inducing layer 102 (that is, a voltage applied by the gate electrode 103 jumps from low to high, a voltage applied by the charge inducing layer 102 jumps from high to low, the gate electrode 103 is applied with a forward bias, and the charge inducing layer 102 is applied with a negative voltage signal), the upper surface of the active layer 101 begins to accumulate negative charge (that is, the first charge is a negative charge at this time), and the lower surface of the active layer 101 begins to accumulate positive charge (that is, the second charge is a negative charge at this time). As voltage values of the first turn-on signal and the second turn-on signal continue to increase, the first charge and the second charge continue to accumulate. When the voltage value of the first turn-on signal is greater than a threshold voltage, the transistor T forms the upper conductive channel 101a and the lower conductive channel 101b on the upper and lower surfaces of the active layer 101, respectively. Carrier types of the upper conductive channel 101a and the lower conductive channel 101b are different, but flow directions of the carriers are the same, so that the currents flowing through the upper conductive channel 101a and the lower conductive channel 101b are superimposed, which can accelerate the turn-on of the transistor T. Specifically, the carriers of the upper conductive channel 101a are electrons, and the carriers of the lower conductive channel 101b are holes.

When the first turn-off signal is applied to the gate electrode 103, and the second turn-off signal is applied to the charge inducing layer 102 (that is, a voltage applied by the gate electrode 103 jumps from a high level to a low level, a voltage applied by the charge inducing layer 102 jumps from a low level to a high level, the gate electrode 103 is reverse biased, and the charge inducing layer 102 is applied with a positive voltage signal), the upper surface of the active layer 101 begins to accumulate positive charge (that is, negative charges are decreased corresponding to the first charge), and the lower surface of the active layer 101 begins to accumulate negative charges (that is, positive charges are decreased corresponding to the second charge). As voltage values of the first turn-off signal and the second turn-off signal continue to decrease, the first charge and the second charge continue to reduce. When the voltage value of the first turn-off signal is less than a threshold voltage, a number of holes in the upper conductive channel 101a is greater than a number of electrons in the upper conductive channel 101, and a number of electrons in the lower conductive channel 101b is greater than a number of holes. In this manner, the upper conductive channel 101a and the lower conductive channel 101b are sequentially closed, thereby delaying the turn-off of the transistor T.

It can be understood that a working principle when the transistor T is a P-type transistor is similar to a working principle when the transistor T is an N-type transistor, and details will not be repeated here.

Compared with the case where the switch signal is applied to both the gate electrode 103 and the charge inducing layer 102, the switch signal applied to only the gate electrode 103 can reduce a process of preparing signal lines for transmitting the second switch signal.

Figure 3:
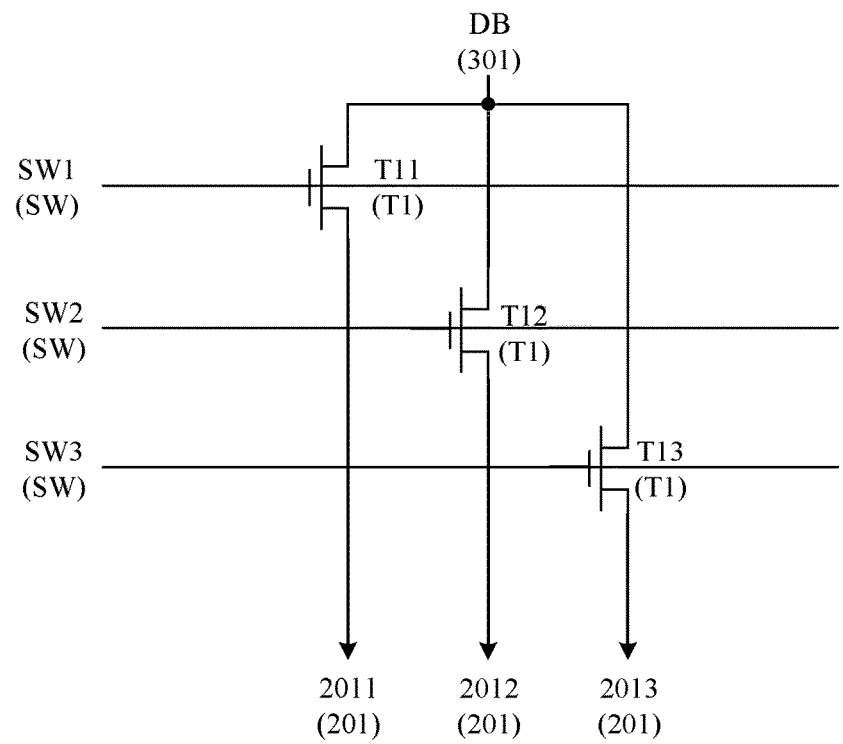
FIG. 3 is a schematic diagram of a demultiplexer provided by an embodiment of the application.

As shown in FIG. 3, FIG. 3 is a schematic diagram of a demultiplexer provided by an embodiment of the application. Please continue to refer to FIGS. 1A and 3, the display panel includes a plurality of signal lines 200 arranged in the display area 100a and a control line arranged in the non-display area 100b. Further, the signal lines 200 include data lines 201 and scan lines 202 intersecting the data lines 201.

The non-display area 100b includes a data signal control area 1001b, and the transistor T includes a first transistor T1 located in the data signal control area 1001b. Further, the display panel includes a demultiplexer located in the data signal control area 1001b, and the demultiplexer includes the first transistor T1.

The control line includes a first control line 301 arranged in the data signal control area 1001b. Further, the first control line 301 is a data bus DB. One of the source electrode or the drain electrode of the first transistor T1 is electrically connected to the first control line 301, and another one of the source electrode or the drain electrode is electrically connected to the data line 201, thereby to enable the first control line 301 to transfer a data signal to the data line 201 through the first transistor T1, so that screen brightness and other information of the display area display can be controlled.

Specifically, please continue to refer to FIG. 3. The switch signal includes a first control signal SW that enables the first transistor T1 to turn on and off. The gate electrode of the first transistor T1 is connected to the first control signal SW, one of the source electrode or the drain electrode of the first transistor T1 is electrically connected to the first control line 301, and the other one of the source electrode or the drain electrode of the first transistor T1 is electrically connected to the data line 201. The first transistor T1 is turned on in response to the first control signal SW, so that the data bus DB is electrically connected to the data line 201 to realize a function of transmitting data signals to the data line 201, that is, the data line 201 is charged through the data bus.

Due to a prolonged conduction time of the first transistor T1, a charging time available for the data line 201 is also extended, which can improve a problem that the display panel does not display smoothly under requirements of high resolutions and high refresh rates, and can help the display panel to achieve high resolutions, high refresh rates, and other design requirements.

Further, the first transistor T1 includes a first sub-transistor T11, a second sub-transistor T12, and a third sub-transistor T13. The first control signal SW includes a first sub-control signal SW1 for controlling on and off of the first sub-transistor T11, a second sub-control signal SW2 for controlling on and off of the second sub-transistor T12, and a third sub-control signal SW3 for controlling on and off the third sub-transistor T13. One of a source electrode or a drain electrode of the first sub-transistor T11 is electrically connected to the first control line 301, and the other one of the source electrode or the drain electrode of the first sub-transistor T11 is electrically connected to a data line 2011. One of a source electrode or a drain electrode of the second sub-transistor T12 is electrically connected to the first control line 301, and the other one of the source electrode or the drain electrode of the second sub-transistor T12 is electrically connected to a data line 2012. One of a source electrode or a drain electrode of the third sub-transistor T13 is electrically connected to the first control line 301, and the other one of the source electrode or the drain electrode of the third sub-transistor T13 is electrically connected to a data line 2013. The first sub-transistor T11, the second sub-transistor T12, and the third sub-transistor T13 are turned on to respond to the first sub-control signal SW1, the second sub-control signal SW2, and the third sub-control signal SW3, respectively, so that the data bus DB is electrically connected to the data lines 2011, 2012, 2013 through the first sub-transistor T11, the second sub-transistor T12, and the third sub-transistor T13, respectively, thereby charging the data line 201 through the data bus DB.

It can be understood that a plurality of the first transistors T1 included in the demultiplexer may be turned on at the same time, may also be turned on in a time-division manner, or may be partially turned on at the same time. That is, the first sub-transistor T11, the second sub-transistor T12, and the third sub-transistor T13 can be turned on at the same time, or at a different time, or two of them can be turned on at the same time. In addition, types of the first sub-transistor T11, the second sub-transistor T12, and the third sub-transistor T13 may be the same or different. Specifically, each of active layers of the first sub-transistor T11, the second sub-transistor T12, and the third sub-transistor T13 includes at least one of an oxide active layer and a silicon active layer. Each of the first sub-transistor T11, the second sub-transistor T12, and the third sub-transistor T13 includes at least one of a P-type transistor and an N-type transistor.

It can be understood that the type of the demultiplexer is not limited to the form shown in FIG. 3, and those skilled in the art can also use other forms of demultiplexers, which will not be repeated here.

Figure 4:
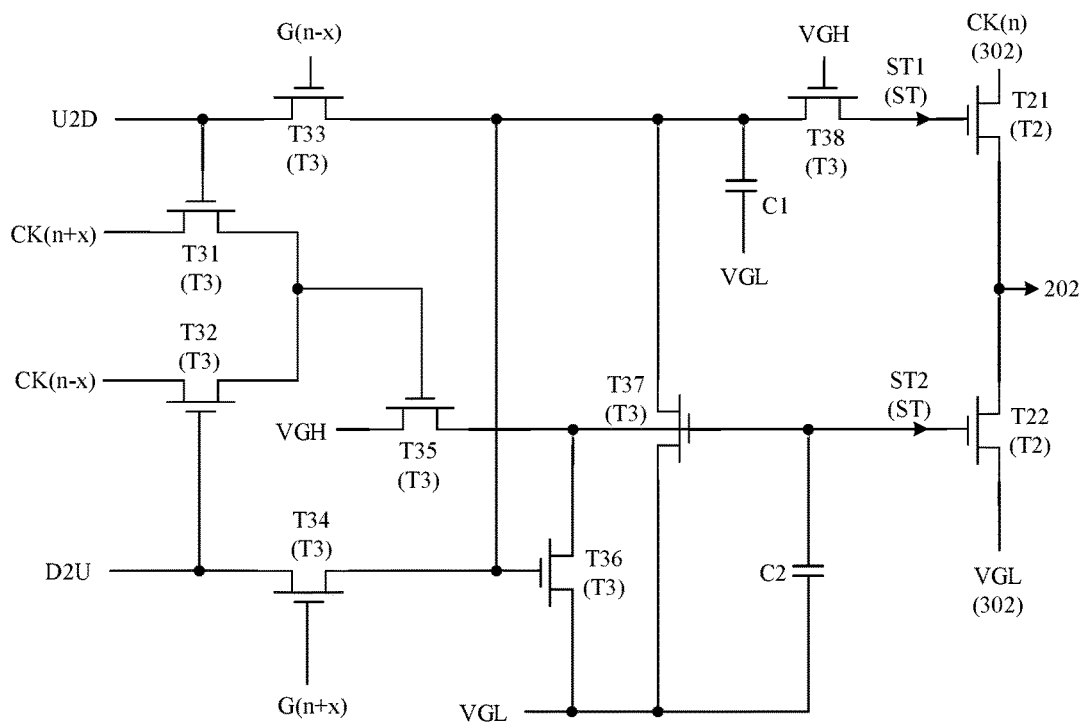
FIG. 4 is a schematic diagram of a gate driver circuit provided by an embodiment of the application.

As shown in FIG. 4, FIG. 4 is a schematic diagram of a gate driver circuit provided by an embodiment of the application. Please continue to refer to FIGS. 1A and 4, the non-display area 100b includes a scan signal control area 1002b, and the transistor T includes a second transistor T2 located in the scan signal control area 1002b. The display panel further includes a gate driver circuit configured in the scan signal control area 1002b, and the gate driver circuit includes the second transistor T2.

Optionally, parameters (such as shape, size, etc.) of active layers and charge inducing layers of the first transistor T1 and the second transistor T2 are different, so that the first transistor T1 and the second transistor T2 meet different performance requirements, as shown in FIGS. 2D to 2E. The first transistor T1 and the second transistor T2 can be formed by a same process in order to simplify fabrication steps and time.

The control line includes a second control line 302 located in the scan signal control area 1002b. One of the source electrode or the drain electrode of the second transistor T2 is electrically connected to the second control line 302, and the other one of the source electrode or the drain electrode of the second transistor T2 is electrically connected to the scan line 202.

Specifically, please continue to refer to FIG. 4. The second control line 302 includes a clock signal line CK(n) and a power supply voltage line VGL, and the switch signal includes a second control signal ST that enables the second transistor T2 to turn on and off. A gate electrode of the second transistor T2 is connected to the second control signal ST, one of the source electrode or the drain electrode of the second transistor T2 is electrically connected to the second control line 302, and the other one of the source electrode or the drain electrode of the second transistor T2 is electrically connected to the scan line 202. The second transistor T2 is turned on or off in response to the second control signal ST to connect the clock signal line CK(n) or the power supply voltage line VGL to the scan line 202, or to cut off the connections between the clock signal line CK(n) or the power supply voltage line VGL and the scan line 202, thereby to realize a function of transmitting scan signals to the scan line 202. Since the second transistor T2 can be turned on in advance, the scan signal can be transmitted to the scan line 202 faster through the second transistor T2, which is beneficial for the display panel to achieve high resolutions, high refresh rates, and other design requirements.

Specifically, the second transistor T2 includes a fourth sub-transistor T21 and a fifth sub-transistor T22. The second control signal ST includes a fourth sub-control signal ST1 for controlling the on and off of the fourth sub-transistor T21, and a fifth sub-control signal ST2 for controlling on and off of the fifth sub-transistor T22. One of a source electrode or a drain electrode of the fourth sub-transistor T21 is electrically connected to the clock signal line CK(n), and the other one of the source electrode or the drain electrode of the fourth sub-transistor T21 is electrically connected to the scan line 202. One of a source electrode or a drain electrode of the fifth sub-transistor T22 is electrically connected to the power supply voltage line VGL, and the other one of the source electrode or the drain electrode of the fifth sub-transistor T22 is electrically connected to the scan line 202. The fourth sub-transistor T21 and the fifth sub-transistor T22 are respectively turned on in the time-division manner in response to the fourth sub-control signal ST1 and the fifth sub-control signal ST2, so that the clock signal line CK(n) or the power supply line VGL is electrically connected to the scan line 202 through the fourth sub-transistor T21 and the fifth sub-transistor T22, respectively, to realize real-time transmission of scan signals.

Further, please continue to refer to FIG. 4. The transistor T further includes a third transistor T3 located in the scan signal control region 1002b. The display panel further includes a signal generation module and storage capacitors C1 and C2 disposed in the scan signal control area 1002b. The signal generation module is configured to generate the second control signal ST according to an input control signal. Each of the storage capacitors C1 and C2 is configured to keep the fourth sub-transistor T21 and the fifth sub-transistor T22 to turn on. Further, the signal generation module includes the third transistor T3.

Optionally, the input control signal includes clock signal lines CK(n+2) and CK(n−2), a power supply voltage line VGL, a voltage signal line VGH, scan signal lines G(n+2) and G(n−2), and signals loaded by forward and reverse scan signal lines U2D and D2U.

Further, the third transistor T3 includes a sixth sub-transistor T31, a seventh sub-transistor T32, an eighth sub-transistor T33, a ninth sub-transistor T34, a tenth sub-transistor T35, an eleventh sub-transistor T36, and a twelfth sub-transistor T37, and a thirteenth sub-transistor T38.

A gate electrode of the sixth sub-transistor T31 is connected to the forward scan signal line U2D, one of a source electrode or a drain electrode of the sixth sub-transistor T31 is connected to a n+x$^{th}$ clock signal line CK(n+x), and the other one of the source electrode or the drain electrode of the sixth sub-transistor T31 is connected to a gate electrode of the tenth sub-transistor T35. A gate electrode of the seventh sub-transistor T32 is connected to the reverse scan signal line D2U, one of a source electrode or a drain electrode of the seventh sub-transistor T32 is connected to a nx$^{th}$ clock signal line CK(nx), and the other one of the source electrode or the drain electrode of the seventh sub-transistor T32 is connected to the gate electrode of the tenth sub-transistor T35, wherein x=1, 2, etc., so that the gate driver circuit adopts a unidirectional driving mode (that is, x=1, a multi-level gate driver circuit is configured on a same side of the display panel) or a bidirectional driving mode (that is, x=2, a multi-level gate driver circuit is configured on both sides of the display panel) to transmit scan signals to the scan lines 202 in the display area.

A gate electrode of the eighth sub-transistor T33 is connected to the n–$x^{th}$ scan signal line G(n–x), one of a source electrode or a drain electrode of the eighth sub-transistor T33 is connected to the forward scan signal line U2D, and the other one of the source electrode or the drain electrode of the eighth sub-transistor T33 is connected to a gate electrode of the eleventh sub-transistor T36. A gate electrode of the ninth sub-transistor T34 is connected to the n+$x^{th}$ scan signal line G(n+x), one of a source electrode or a drain electrode of the ninth sub-transistor T34 is connected to the reverse scan signal line D2U, and the other one of the source electrode or the drain electrode of the ninth sub-transistor T34 is connected to the gate electrode of the eleventh sub-transistor T36.

One of a source electrode or a drain electrode of the tenth sub-transistor T35 is connected to the voltage signal line VGH, and the other one of the source electrode or the drain electrode of the tenth sub-transistor T35 is connected to one of a gate electrode of the twelfth sub-transistor T37, a gate electrode of the fifth sub-transistor T22, or a source electrode or a drain electrode of the eleventh sub-transistor T36. The other one of the source electrode or the drain electrode of the eleventh sub-transistor T36 is connected to the power supply voltage line VGL. One of a source electrode or a drain electrode of the twelfth sub-transistor T37 is connected to the power supply voltage line VGL, and the other one of the source electrode or the drain electrode of the twelfth sub-transistor T37 is connected to one of the source electrode or the drain electrode of the eighth sub-transistor T33, and one of a source electrode or a drain electrode of the thirteenth sub-transistor T38. A gate electrode of the thirteenth sub-transistor T38 is connected to the voltage signal line VGH, and the other one of the source electrode or the drain electrode of the thirteenth sub-transistor T38 is connected to a gate electrode of the fourth sub-transistor T21.

One end of the storage capacitor C1 is connected to one of the source electrode or the drain electrode of the thirteenth sub-transistor T38, and the other end is connected to the power supply voltage line VGL. One end of the storage capacitor C2 is connected to the gate electrode of the fifth sub-transistor T22, and the other end is connected to the power supply voltage line VGL.

The sixth sub-transistor T31 and the seventh sub-transistor T32 are N-type transistors. When the display panel is in a forward scanning state, the forward scan signal loaded by the forward scan signal line U2D is at a high level, and the reverse scan signal loaded by the reverse scan signal line D2U is at a low level, and the gate driver circuit realizes progressive scanning from top to bottom. When the display panel is in a reverse scanning state, the forward scan signal loaded by the forward scan signal line U2D is at a low level, and the reverse scan signal loaded by the reverse scan signal line D2U is at a high level, the gate driver circuit realizes progressive scanning from bottom to top. Similarly, a scanning form of the gate driver circuit when the sixth sub-transistor T31 and the seventh sub-transistor T32 are P-type transistors can be obtained.

Take the second transistor T2 and the third transistor T3 as N-type transistors, the forward scan signal loaded by the forward scan signal line U2D is high level, and the reverse scan signal loaded by the reverse scan signal line D2U is low as an example.

The sixth sub-transistor T31 is turned on, an n+$x^{th}$ level clock signal loaded by the n+$x^{th}$ clock signal line CK(n+x) is at a low level, and the tenth sub-transistor T35 is turned off. When an n$x^{th}$ scan signal loaded by the n$x^{th}$ scan signal line G(nx) is at a high level, the eighth sub-transistor T33 is turned on, the eleventh sub-transistor T36 and the thirteenth sub-transistor T38 are turned on, the storage capacitor C1 is charged, and a high-level signal loaded by the forward scan signal line U2D functioning as the fourth sub-control signal ST1 is transmitted to the gate electrode of the fourth sub-transistor T21, so that the fourth sub-transistor T21 is turned on. An $n^{th}$ level clock signal loaded by the clock signal line CK(n) is transmitted to the scan line 202, and when the $n^{th}$ level clock signal loaded by the clock signal line CK(n) is at a high level, a bootstrap effect occurs on the gate electrode of the fourth sub-transistor T21. When the $n^{th}$ level clock signal loaded by the clock signal line CK(n) changes from a high level to a low level, the bootstrap effect disappears.

The sixth sub-transistor T31 is turned on, an n+$x^{th}$ level clock signal loaded by the n+$x^{th}$ clock signal line CK(n+x) is at a high level, and the tenth sub-transistor T35 is turned on, the twelfth sub-transistor T37 is turned on, and the storage capacitor C2 is charged. A high-level signal loaded by the voltage signal line VGH functioning as the fifth sub-control signal ST2 is transmitted to the gate electrode of the fifth sub-transistor T22, so that the fifth sub-transistor T22 is turned on. When the n+$x^{th}$ level scan signal loaded by the n+$x^{th}$ level scan signal line G(n+x) is a high level, the ninth sub-transistor T34 is turned on, and the eleventh sub-transistor T46 is turned off. A low-level signal loaded by the reverse scan signal line D2U functioning as the fourth sub-control signal ST1 is transmitted to the gate electrode of the fourth sub-transistor T21, so that the fourth sub-transistor T21 is turned off.

It can be understood that a type of the gate driver circuit is not limited to the form shown in FIG. 4, and those skilled in the art can also use other forms of gate driver circuit, which will not be repeated here.

Please continue to refer to FIGS. 1A to 1D. The display panel further includes a driving transistor Td located in the display area 100a and a subpixel 106 electrically connected to the driving transistor Td. The driving transistor Td is turned on in response to the scan signal loaded by the scan line 202, and is configured to drive the subpixel 106 to emit light according to the data signal loaded by the data line 201.

Optionally, the driving transistor Td and the transistor T are prepared synchronously to reduce a fabrication process and cost. Specifically, the driving transistor Td includes a first active layer 401, and the first active layer 401 is in the same layer as the active layer 101. The driving transistor Td includes a gate electrode 403, a source electrode and a drain electrode. The gate electrode 403 of the driving transistor Td is in the same layer as the gate electrode 103 of the transistor T, the source and drain electrodes of the driving transistor Td may be formed by an electrode layer 402, the electrode layer 402 is located on a side of the gate electrode 403 away from the first active layer 401, and a third insulating layer 1043 is provided between the electrode layer 402 and the gate electrode 403. In addition, the display panel may not include the charge inducing layer 102 in the display area 100a, and may also include the charge inducing layer 102 to prevent light from irradiating the first power layer 401, avoid a reduction of a switching ratio of the driving transistor Td, and ensure that the driving transistor Td has better electrical performance.

Figure 1B:
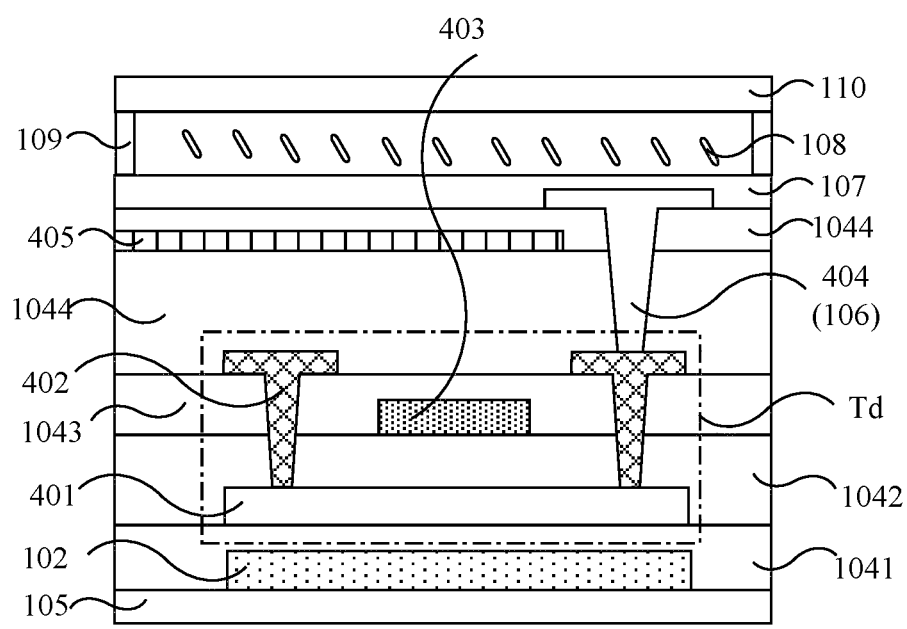
Figure 1C:
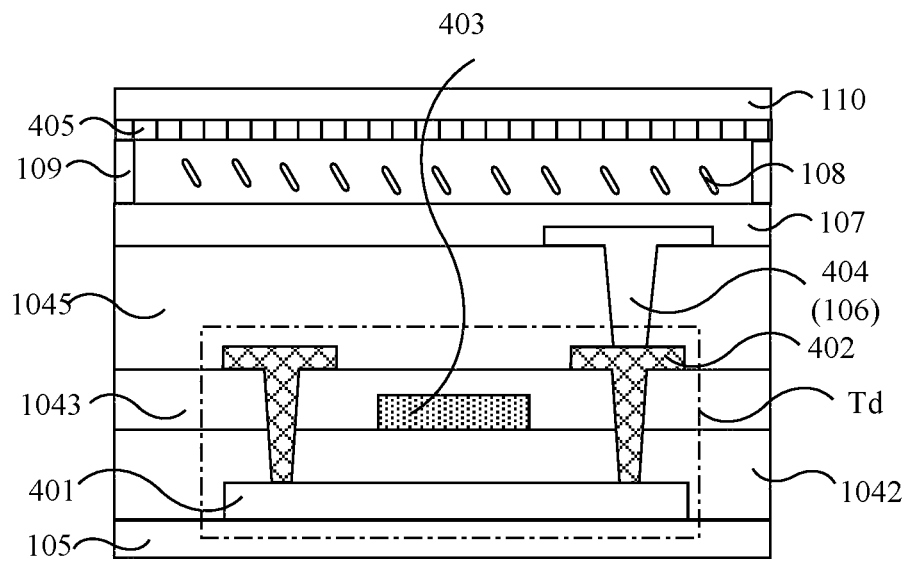

Further, please continue to refer to FIGS. 1A to 1C. The display panel is a liquid crystal display panel and further includes a pixel electrode 404 and a common electrode 405. The pixel electrode 404 is located in the display area 100a, and the common electrode 405 is located on a side of the pixel electrode 404, wherein the subpixel 106 includes the pixel electrode 404.

Specifically, the pixel electrode 404 is located on a side of the gate electrode 403 of the driving transistor Td away from the first active layer 401. The common electrode 405 is located between the pixel electrode 404 and the gate 403 of the driving transistor Td, so that the pixel electrode 404 and the common electrode 405 are located on the same substrate; or the common electrode 405 is located on a side of the pixel electrode 404 away from the gate electrode 403 of the driving transistor Td, so that the pixel electrode 404 and the common electrode 405 are located on different substrates.

Further, please continue to refer to FIG. 1B. The display panel further includes a first substrate 105, a fourth insulating layer 1044, a protection layer 107, a liquid crystal 108, a sealant 109, and a second substrate 110. The driving transistor Td, the sub-pixel 106, and the transistor T are all located on the first substrate 105. The fourth insulating layer 1044 is located between the driving transistor Td and the common electrode 405 and the common electrode 405 and the pixel electrode 404. The protection layer 107 is located on a side of the pixel electrode 404 away from the common electrode 405. The liquid crystal 108 and the sealant 109 are located between the first substrate 105 and the second substrate 110. It can be understood that the display panel further includes an alignment layer, a polarizer, and other parts not shown.

Further, please continue to refer to FIG. 1C. The display panel further includes the first substrate 105, the protection layer 107, the liquid crystal 108, the sealant 109, the second substrate 110, and a fifth insulating layer 1045. The fifth insulating layer 1045 is located between the driving transistor Td and the pixel electrode 404, and the protective layer 107 is located on a side of the pixel electrode 404 away from the first substrate 105. The common electrode 405 is located on the second substrate 110, and the liquid crystal 108 is located between the pixel electrode 404 and the common electrode 405. It can be understood that the display panel further includes an alignment layer, a polarizer, a backlight module, and other parts not shown.

Figure 1D:
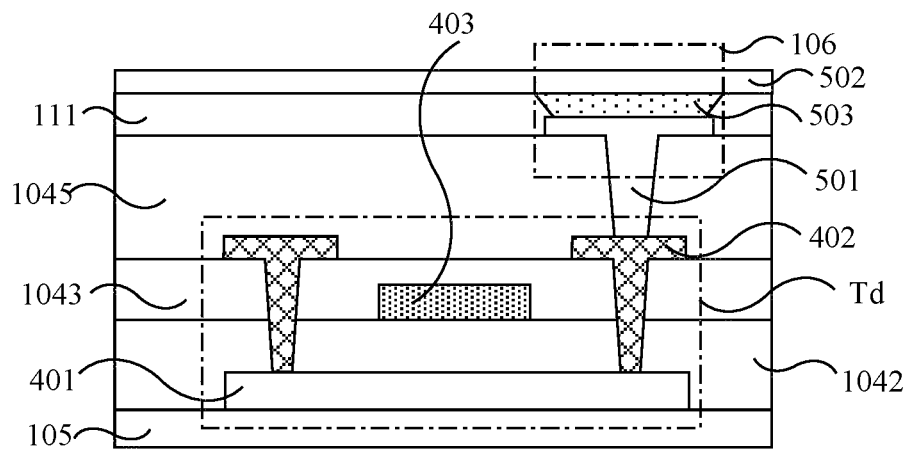

Further, please continue to refer to FIGS. 1A and 1D. The display panel is a self-luminous display panel. The display panel further includes a light-emitting device, the first substrate 105, and a pixel definition layer 111. The light-emitting device includes an anode 501, a cathode 502, and a light-emitting layer 503. The anode 501 is located on a side of the driving transistor Td, and the cathode 502 is located on a side of the anode 501 away from the driving transistor Td. The light-emitting layer 503 is located between the anode 501 and the cathode 502, and is located in the pixel definition area of the pixel definition layer 111, wherein the subpixel 106 includes the light-emitting device.

Specifically, the anode 501 is located on a side of the gate electrode 403 of the driving transistor Td away from the first active layer 401, and the cathode 502 is located on a side of the anode 501 away from the driving transistor Td. It can be understood that the display panel further includes a polarizer, a filter, and other parts not shown. Further, the light-emitting layer 503 and/or the filter include fluorescent materials, quantum dot materials, perovskite materials, etc., to improve light-emitting quality of the light-emitting device or display quality of the display panel.

It can be understood that the display panel includes a pixel driving circuit, and the pixel driving circuit includes the driving transistor Td. The scan signal loaded by the scan line 202 may act on the gate electrode 403 of the driving transistor Td, or may indirectly act on the gate electrode 403 of the driving transistor Td, that is, the pixel driving circuit further includes a fourth transistor, a fifth transistor, etc. The gate electrodes of the fourth transistor and the fifth transistor are turned on in response to the scan signal loaded by the scan line 202, so as to transmit a control signal for turning on or off the driving transistor Td to the gate electrode of the driving transistor through the fourth transistor and the fifth transistor, respectively. The pixel driving circuit includes 2T1C, 3T1C, 7T1C, or 7T2C, and other structural forms, which will not be repeated here.

The application further provides a display device including any of the above-mentioned display panels.

Further, the display device further includes a sensor, so that the display device can perform functions, such as fingerprint recognition, distance sensing, and camera, wherein the sensor includes photoelectric sensors, distance sensors, light sensors, cameras, gyroscope sensors, etc.

The application discloses a display panel and a display device. The display panel includes a display area and a non-display area. The display panel includes a transistor disposed in the non-display area, and the transistor includes an active layer, a charge inducing layer, a gate electrode, a first insulating layer, and a second insulating layer. The charge inducing layer is disposed on a side of the active layer. The first insulating layer is disposed between the active layer and the charge inducing layer. The gate electrode is disposed on a side of the active layer away from the charge inducing layer. The second insulating layer is disposed between the active layer and the gate electrode. In this manner, the actively layer, the gate electrode, and the charge inducing layer collectively form a capacitance system, which benefits extending of the conduction time of the transistor, thereby giving a boost to an increase in a charging rate of the data line, and ensuring a smooth display of the display panel.

In the above-mentioned embodiments, the description of each embodiment has its own emphasis. For parts that are not described in detail in an embodiment, reference may be made to related descriptions of other embodiments.

The display panel and the display device provided by the embodiments of the present application are described in detail above. Specific examples are used in this article to explain the principles and implementation of this application. The descriptions of the above embodiments are only used to help understand the technical solutions and core ideas of this application. Those of ordinary skill in the art should understand that: they can still modify the technical solutions described in the foregoing embodiments, or equivalently replace some of the technical features; and these modifications or replacements do not cause the essence of the corresponding technical solutions to deviate from the scope of the technical solutions of the embodiments of the present application.

What is claimed is:
1. A display panel, comprising:
  a display area and a non-display area, and the display panel comprising a transistor disposed in the non-display area; wherein the transistor comprises:
  an active layer;

a charge inducing layer disposed on a side of the active layer;
a first insulating layer disposed between the active layer and the charge inducing layer;
a gate electrode disposed on a side of the active layer away from the charge inducing layer; and
a second insulating layer disposed between the active layer and the gate electrode;
wherein based on a turn-on signal applied to the gate electrode and/or the charge inducing layer, a first charge is induced on an upper surface of the active layer, and a second charge is induced on a lower surface of the active layer and is different from a charge in polarity on an upper surface of the charge inducing layer, wherein an upper conductive channel and a lower conductive channel are disposed on the upper surface and the lower surface of the active layer, respectively, subject to accumulation of the first charge and the second charge; and
wherein based on a turn-off signal applied to the gate electrode and/or the charge inducing layer, a charge different from the first charge in polarity is induced on the upper surface of the active layer, a charge different form the second charge in polarity is induced on the lower surface of the active layer, wherein the upper conductive channel and the lower conductive channel are sequentially closed subject to a decrease of the first charge and the second charge.

2. The display panel of claim 1, wherein the turn-on signal comprises a first turn-on signal applied to the gate electrode and a second turn-on signal applied to the charge inducing layer, wherein the first turn-on signal and the second turn-on signal are voltage signals with a same magnitude.

3. The display panel of claim 1, wherein the non-display area comprises a data signal control area, the display panel comprises a demultiplexer located in the data signal control area, and the transistor comprises a first transistor located in the data signal control area, wherein the demultiplexer includes the first transistor.

4. The display panel of claim 3, further comprising a data line arranged in the display area, and a first control line arranged in the data signal control area, wherein one of a source electrode or a drain electrode provided by the first transistor is electrically connected to the first control line, and another one of the source electrode or the drain electrode is electrically connected to the data line.

5. The display panel of claim 4, wherein the first control line includes a data bus line.

6. The display panel of claim 3, wherein the non-display area comprises a scan signal control area, the display panel comprises a gate driver circuit disposed in the scan signal control area, and the transistor comprises a second transistor located in the scan signal control area, wherein the gate driver circuit comprises the second transistor.

7. The display panel of claim 6, further comprising a scan line arranged in the display area and intersecting the data line, and a second control line arranged in the scan signal control area, wherein one of a source electrode or a drain electrode provided by the second transistor is electrically connected to the second control line, and another one of the source electrode or the drain electrode is electrically connected to the scan line.

8. The display panel of claim 7, wherein the second control line comprises a clock signal line and a power supply voltage line.

9. The display panel of claim 7, further comprising a signal generation module disposed in the scan signal control area, wherein the signal generation module is configured to generate a second control signal according to an input control signal, and the second control signal is configured to control turning on and off of the second transistor.

10. The display panel of claim 9, wherein the transistor further comprises a third transistor disposed in the scan signal control area, and the signal generation module comprises the third transistor.

11. The display panel of claim 7, further comprising a driving transistor disposed in the display area and a subpixel electrically connected to the driving transistor, wherein the driving transistor is configured to be turned on in response to a scan signal provided by the scan line, and drive the subpixel to emit light according to a data signal provided by the data line.

12. The display panel of claim 1, wherein an orthographic projection defined by the active layer is projected within a boundary of the charge inducing layer.

13. The display panel of claim 1, wherein the charge inducing layer has a thickness greater than or equal to 300 angstroms and less than or equal to 700 angstroms.

14. A display device, comprising:
a display panel comprising a display area and a non-display area, wherein the display panel comprises a transistor disposed in the non-display area, and the transistor comprises:
an active layer;
a charge inducing layer disposed on a side of the active layer;
a first insulating layer disposed between the active layer and the charge inducing layer;
a gate electrode disposed on a side of the active layer away from the charge inducing layer; and
a second insulating layer disposed between the active layer and the gate electrode;
wherein based on a turn-on signal applied to the gate electrode and/or the charge inducing layer, a first charge is induced on an upper surface of the active layer, and a second charge is induced on a lower surface of the active layer and is different from a charge in polarity on an upper surface of the charge inducing layer, wherein an upper conductive channel and a lower conductive channel are disposed on the upper surface and the lower surface of the active layer, respectively, subject to accumulation of the first charge and the second charge; and
wherein based on a turn-off signal applied to the gate electrode and/or the charge inducing layer, a charge different from the first charge in polarity is induced on the upper surface of the active layer, a charge different form the second charge in polarity is induced on the lower surface of the active layer, wherein the upper conductive channel and the lower conductive channel are sequentially closed subject to a decrease of the first charge and the second charge.

15. The display device of claim 14, wherein the turn-on signal includes a first turn-on signal applied to the gate electrode and a second turn-on signal applied to the charge inducing layer, wherein the first turn-on signal and the second turn-on signal are voltage signals with a same magnitude.

16. The display device of claim 14, wherein the non-display area comprises a data signal control area, the display panel comprises a demultiplexer located in the data signal control area, and the transistor comprises a first transistor located in the data signal control area, wherein the demultiplexer includes the first transistor.

17. The display device of claim 16, wherein the non-display area comprises a scan signal control area, the display panel comprises a gate driver circuit disposed in the scan signal control area, and the transistor comprises a second transistor located in the scan signal control area, wherein the gate driver circuit comprises the second transistor.

* * * * *